United States Patent

Specht

[11] Patent Number: 6,129,379
[45] Date of Patent: Oct. 10, 2000

[54] DEVICE FOR SENSING MOVEMENT OF AN AIRBAG

[75] Inventor: Martin Specht, Feldafing, Germany

[73] Assignee: Breed Automotive Technology, Inc., Lakeland, Fla.

[21] Appl. No.: 09/335,133

[22] Filed: Jun. 17, 1999

[30] Foreign Application Priority Data

Jul. 1, 1998 [DE] Germany ............ 298 11 733 U

[51] Int. Cl.⁷ .................................................. B60R 21/26
[52] U.S. Cl. .................. 280/735; 280/739; 280/743.2
[58] Field of Search .......................... 280/728.1, 735, 280/739, 743.2

[56] References Cited

U.S. PATENT DOCUMENTS

| 5,246,250 | 9/1993 | Wolanin et al. | 280/739 |
| 5,762,367 | 6/1998 | Wolanin | 280/736 |
| 5,957,490 | 9/1999 | Sinnhuber | 280/735 |

FOREIGN PATENT DOCUMENTS

| 0812741 | 12/1997 | European Pat. Off. . |
| 0836971 | 4/1998 | European Pat. Off. . |
| 19611384 | 9/1997 | Germany . |
| 2329058 | 3/1999 | United Kingdom . |

*Primary Examiner*—Kenneth R. Rice
*Attorney, Agent, or Firm*—Lonnie R. Drayer

[57] ABSTRACT

A device senses movement of the front part of an airbag during deployment with a sensing element that is extended during inflation of the airbag and delivers a measured value for the movement of the airbag. Electrical connections are mechanically separated in a time sequence during the sensing of movement, the successive separation processes being detectable electrically and/or electronically.

20 Claims, 3 Drawing Sheets

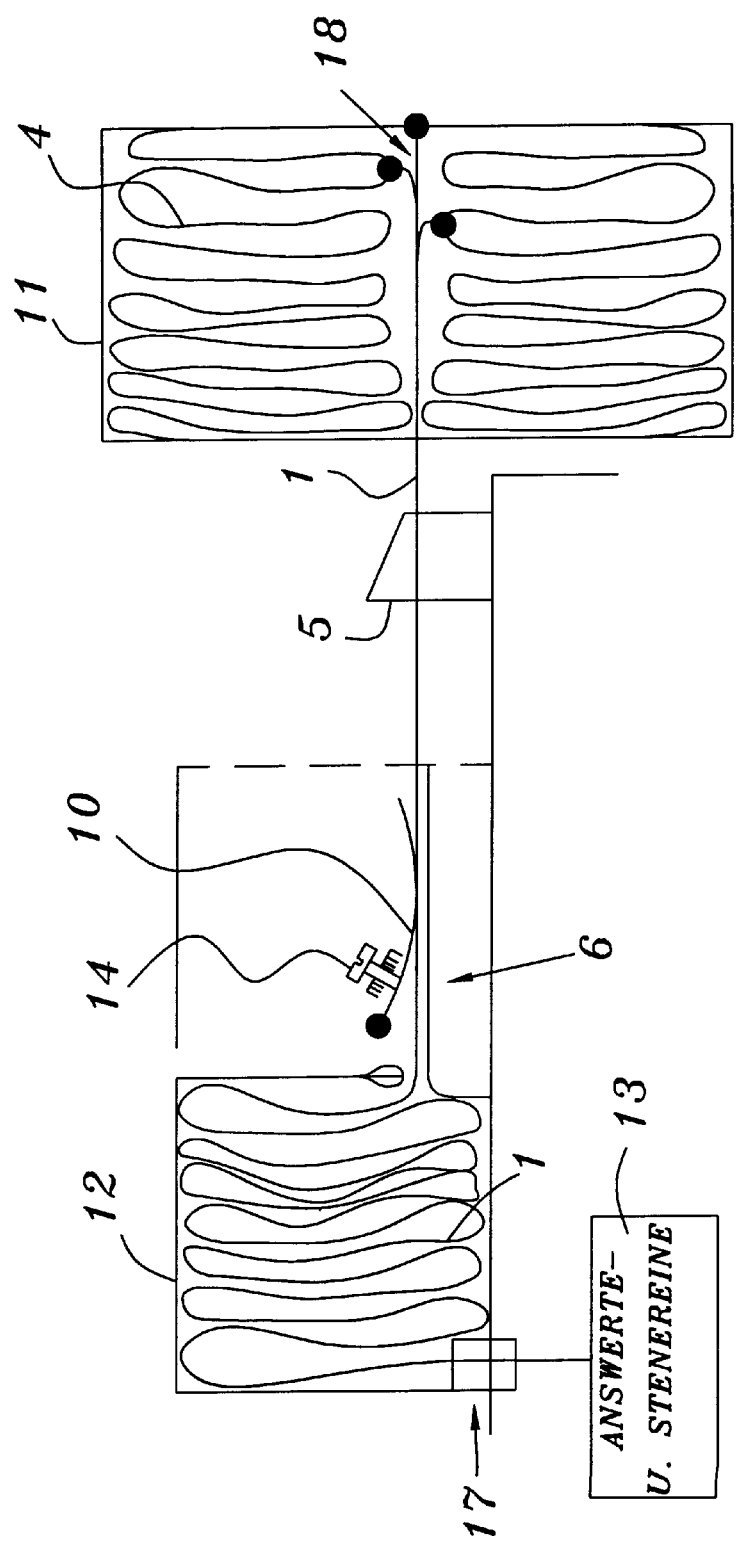

DEVICE FOR SENSING MOVEMENT OF AN AIRBAG

FIELD OF THE INVENTION

The present invention relates to a device for sensing the movement of the front part of an airbag during deployment with a sensing element that is extended during deployment of the airbag and delivers a measured value for the respective location of the front part of the airbag.

BACKGROUND OF THE INVENTION

As used herein and in the claims the "front part" of an airbag is understood to be the portion of the airbag that is presented for contact with a vehicle occupant when the airbag is inflated and deployed.

When deploying a passenger side airbag, a large volume of inflation gas (up to 130 liters) is delivered to the airbag in a relatively short time (about 25 milliseconds). This results in a risk of injury for the vehicle occupant, particularly if the vehicle occupant is out of position, for example when sleeping or leaning forward. Known sensing devices ensure that the airbag is deployed as a function of the unimpeded advance movement of the airbag which can be determined by the sensing device.

DISCUSSION OF THE PRIOR ART

A device for sensing the movement of the front part of an airbag during deployment of this type is known from DE 196 11 384 A1 or EP 0 812 741 A1. With the known sensing device, an elongate sensing element in the form of a strip or thread connected to the airbag is extended during inflation of the airbag. The sensing device delivers respective measured values during the deployment of the airbag.

SUMMARY OF THE INVENTION

It is an object of the invention to sense movement of the front part of an airbag during deployment and provide measured values for the unimpeded deployment of the airbag at low cost using simple means.

According to the invention, this object is achieved by providing a plurality of electrical connections that can be mechanically separated in a time sequence during the sensing of movement, the successive separation processes being detectable electrically and/or electronically.

For this purpose, the electrical connections can be arranged on a substrate, in particular on at least one strip in whose longitudinal direction the sensing of movement takes place, wherein the strip can be mechanically separated in its longitudinal direction. The mechanical separation system is preferably a cutting edge, in particular on a blade, which separates the electrical connections and/or the strip. For this purpose, the substrate or the strip, can be moved in its longitudinal direction for separating the electrical connections. A plurality of strips can also be moved with the airbag, these strips preferably being separated by a cutting edge. However, it is also possible to move the blade with the movement of the airbag during deployment and to keep the electrical connections stationary on the substrate or the strip. For this purpose, the strip can be arranged in the form of a spiral or a circle, the blade being guided along the spiral or the circle as a function of the movement of the front part of the airbag during deployment.

In a preferred embodiment, the strip is extended with during inflation of the airbag. For this purpose, the strip is connected to the front part of the airbag. The electrical connections on the strip can be separated by separating the strip in its longitudinal direction, for example using the cutting edge of the blade. A guide system for the extended sensing element, which can be the strip or the cutting edge, ensures that the electrical connections are reliably separated so that measured values are produced which deliver data for the respective movement of the airbag during deployment. The electrical connections that are separated can be so designed that a digital scanning is achieved. For this purpose, the electrical connections can be in the form of conductor tracks that are severed during the movement of the sensing element. For this purpose, the conductor tracks, in particular copper conductor tracks, can comprise conductor portions that extend transversely to the longitudinal direction of the strip and are separated. The strip can be designed as a plastic film to which the conductor tracks are applied in a known manner.

It is also possible to arrange resistances on the strip which are electrically interconnected, in particular in parallel. An analog signal can be evaluated for the movement of the front part of the airbag during deployment is generated by separating the portions of connecting conductor which produce the parallel circuit of the resistances.

The strip can comprise recesses, in particular of triangular shape, in the longitudinal direction through which additional guidance of the cutting edge is achieved during the separation process.

BRIEF DESCRIPTION OF THE DRAWINGS

Embodiments of the invention will be described in more detail with reference to the FIGS., in which:

FIG. 4 is a schematic view of a sensing device for sensing the advance movement of an airbag during deployment as an embodiment of the invention.

DETAILED DESCRIPTION OF THE INVENTION

FIG. 4 shows schematically an embodiment of a sensing device for sensing the movement of the front part of an airbag 4 during deployment. As used herein and in the claims the "front part" of an airbag is understood to be the portion of the airbag that is presented for contact with a vehicle occupant when the airbag is inflated and deployed. The airbag 4 is located in a known manner in a receiving compartment 11. The airbag 4 is preferably designed as a passenger side airbag. The receiving compartment for the folded airbag is arranged at a suitable location in, or beneath, the instrument panel.

A plurality of sensing elements, which are designed as strips 1, are connected to the part of the airbag 4 which forms the front part when the airbag is inflated and deployed. The strips can be formed of plastic film. The strips 1 are connected to the front part of the airbag 4 at several connecting points. In the resting state, the major part of the strip to be sensed in each case is located in a strip store 12. Three strips are provided in the embodiment illustrated. The number of strips and their respective connecting points on the airbag can be selected according to the airbag and/or type of vehicle.

Figure 1:
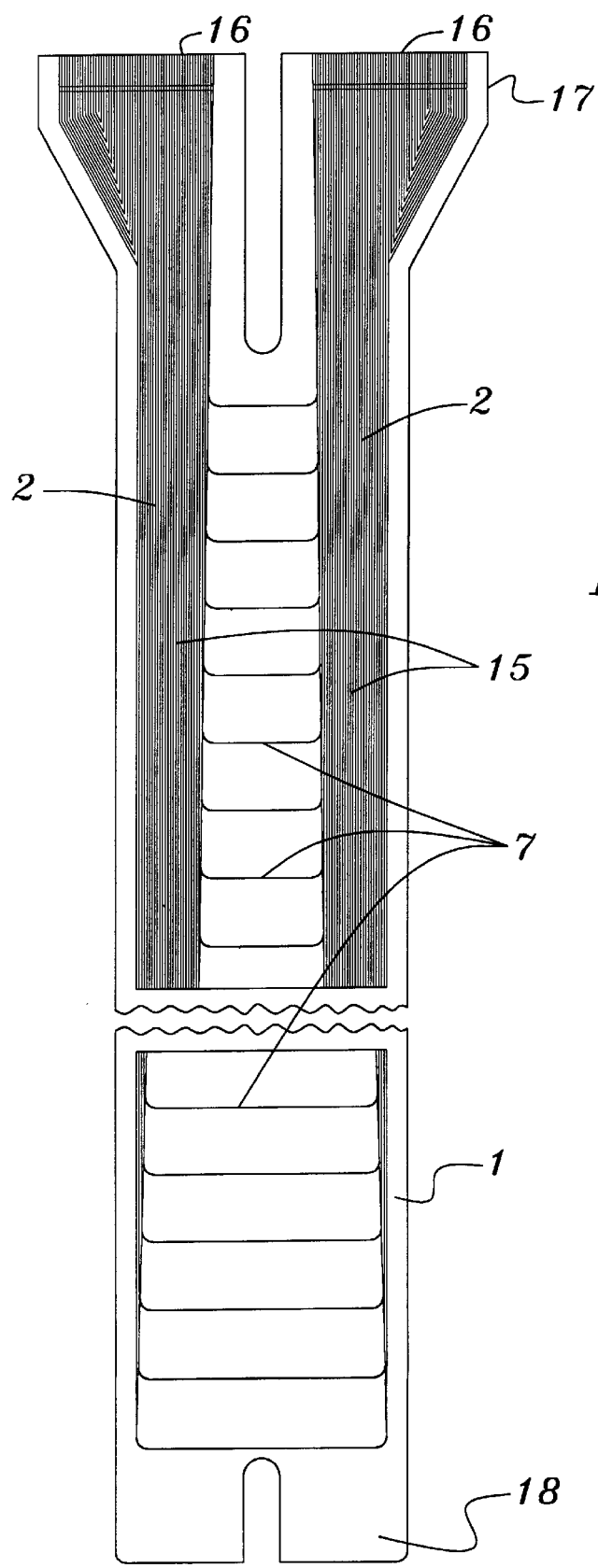
FIG. 1 shows a first embodiment of a sensing element having a strip-shaped configuration.
Figure 2:
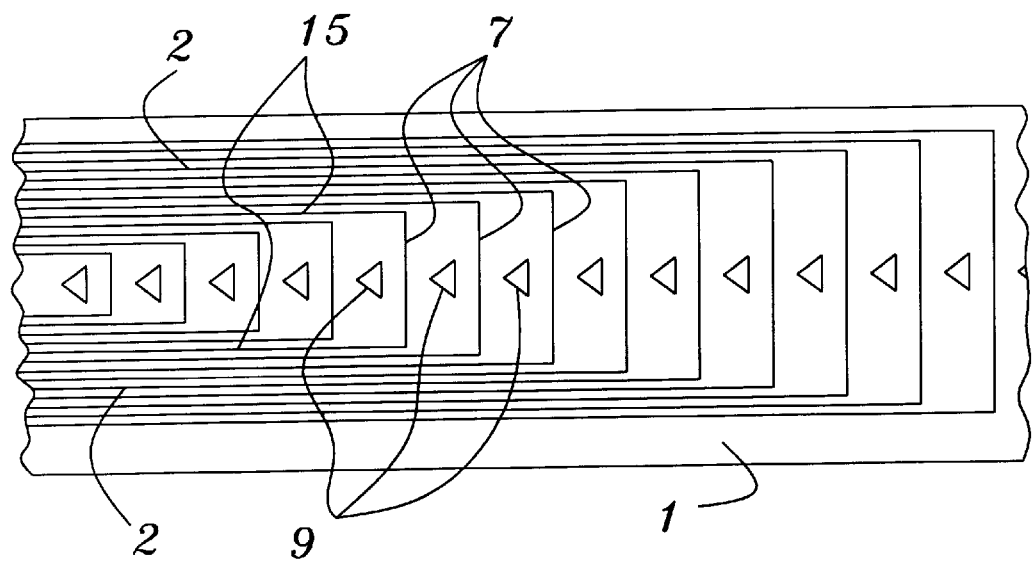
FIG. 2 shows a second embodiment of a sensing element having a strip-shaped configuration.
Figure 3:
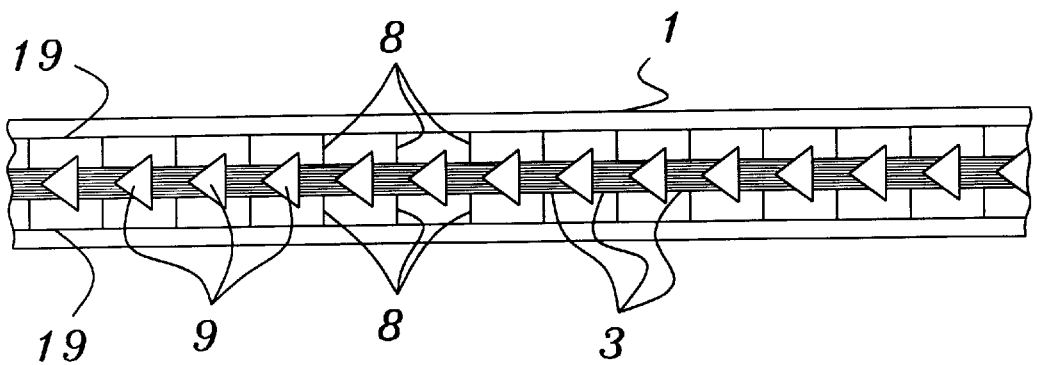
FIG. 3 shows a third embodiment of a sensing element having a strip-shaped configuration.

Various embodiments of the strip are shown in FIGS. 1, 2 and 3. Electrical connections are provided on the strip. In the embodiment shown in FIGS. 1 and 2, these electrical connections are formed by electrical conductor tracks 2. The individual conductor tracks, for example on laminated copper conductor tracks, extend on either side of the longitudinal center of the strip parallel to the lateral edges of the strip 1. Each conductor track is formed by two conductor portions 15 extending parallel to the longitudinal edges of the strip. The conductor portions possess contact regions 16 at their ends. These contact regions are located at one end 17 of the strip. The connecting points with the front part of the airbag 4 are located at the other end 18 of the strip (FIG. 4).

The respective conductor portions 15 extending substantially parallel to the longitudinal direction of the strip are connected to one another by conductor portions 7 extending transversely to the longitudinal direction of the strip. The conductor portions of the various conductor tracks 2 are arranged in succession as viewed in the longitudinal direction of the strip and are equidistant from one another.

During inflation of the airbag 4 using a gas generator system, not shown in detail, the front part of the airbag in FIG. 4 moves into the interior of the vehicle. The strip 1 is thereby extended, the strip being separated substantially in its longitudinal center by means of a cutting edge 5. As used herein and in the claims the term, "extend" and "extended" are understood to have their common meaning of stretching or straightening out. The conductor portions 7 extending transversely to the strip direction are thereby also separated. The separation of a respective conductor portion 7 is determined by an evaluating device 13 connected to the contact regions 16. In particular, the number and timing of successive separation processes can be detected by the evaluating and control device 13. The evaluating and control device can detect the extracted length by the number of successive separation processes. The speed of extraction and therefore deployment of the airbag 4 can be determined by the time intervals between the individual separation processes. The inflation of the airbag can then be controlled as a function thereof, as known from DE 196 11 384 or EP 0 812 741 A1.

In the embodiment shown in FIG. 2, triangular recesses 9 are formed in the strip material, for example by punching, along the longitudinal center line of the strip 1. The guidance of the cutting edge 5, which can be provided on a stationary blade, is thus improved.

With the embodiment of a sensing element shown in FIG. 3, individual resistances 3 that are interconnected in parallel are provided on the strip 1 as electrical connections. The individual resistances 3 are formed by a resistance layer strip that extends along the center of the strip 1 and is divided into the various individual resistances 3 by the triangular recesses 9. As in the embodiment shown in FIGS. 1 and 2, one strip end 18 is connected to the front part of the airbag 4 and the other strip end 17 also possesses contact regions for two longitudinally guided conductor tracks 19 on which the individual resistances 3 are connected in parallel via conductor portions 8. The two conductor tracks 19 are connected to the evaluating and control device 13 in the region of the strip end 17 (FIG. 4).

The resistance layer track is divided into the individual resistances with respectively equal resistance values by the recesses 9. For example, 45 individual resistances can be provided. When the strip 1 is separated into two halves, as also in the embodiments in FIGS. 1 and 2, resistances are separated from the parallel circuit as the length of advance increases, so that a changing total resistance of the parallel circuit is produced as a function of the length of advance of the airbag 4. This changing resistance value is evaluated in the evaluating and control device 13 and is converted into corresponding control or adjustment of the inflation volume of the airbag.

When the front part of the airbag meets an obstacle, the extension the strip 1 is stopped or decelerated and a corresponding adjustment of the airbag deployment process, for example valve control, is initiated.

It is also possible to provide a series circuit of resistances rather than a parallel circuit of individual resistances, corresponding resistances being separated from the series circuit as a function of the movement.

A material which can be accommodated in a stackable, rollable or other manner in an identical storage volume in the strip store 12 is used for the strip 1. The strip preferably comprises of a plastic film having adequate flexibility.

A guide system 6 for the strip is located between the strip store 12 and the cutting edge 5. This guide means can comprise a substrate against which the strip is pressed by means of a leaf spring 10. The contact pressure can be adjusted by means of an adjusting screw 14. A corresponding plug connector strip or plug contacts can be provided for connecting the electrical conductor strips 2 or the parallel circuit of the resistances 3 to the evaluating device 13.

Instead of the stationary cutting edge 5 which separates the strip, extended with the airbag 4 in the longitudinal direction, in two halves along the center line of the strip, the kinematic reversal can also be used, during which the strip is held stationary by the electrical connections and the cutting edge 5 is extended with the airbag 4 during the inflation thereof.

It will be apparent to those skilled in the art that modifications may be made to the above disclosed embodiments without departing from the spirit and scope of the invention. Accordingly, it is not intended that the invention be limited except as may be necessary in view of the appended claims.

What is claimed is:

1. A device for sensing movement of the front part of an airbag comprising a sensing element that is extended during inflation of the airbag and delivers a measured value for the movement of the airbag, a plurality of electrical connections which can be mechanically separated in a time sequence during the sensing of movement, the successive separation processes being detectable by an electric means.

2. The device for sensing movement of the front part of an airbag according to claim 1 wherein the electrical connections are arranged on at least one strip in whose longitudinal direction the sensing of movement takes place, the strip being mechanically separated in its longitudinal direction.

3. The device for sensing movement of the front part of an airbag according to claim 1 wherein the at least one strip is connected to the airbag for extension during the sensing of movement.

4. The device for sensing movement of the front part of an airbag according to claim 2 wherein the at least one strip is connected to the airbag for extension during the sensing of movement.

5. The device for sensing movement of the front part of an airbag according to claim 1 further comprising a stationary separation device.

6. The device for sensing movement of the front part of an airbag according to claim 2 further comprising a stationary separation device.

7. The device for sensing movement of the front part of an airbag according to claim 3 further comprising a stationary separation device.

8. The device for sensing movement of the front part of an airbag according to claim 4 further comprising a stationary separation device.

9. The device for sensing movement of the front part of an airbag according to claim 1 with a cutting edge provided for the separation process.

10. The device for sensing movement of the front part of an airbag according to claim 8 with a cutting edge provided for the separation process.

11. The device for sensing movement of the front part of an airbag according to claim 1 further comprising a guide system provided for the extended sensing element.

12. The device for sensing movement of the front part of an airbag according to claim 8 further comprising a guide system provided for the extended sensing element.

13. The device for sensing movement of the front part of an airbag according to claim 10 further comprising a guide system provided for the extended sensing element.

14. The device for sensing movement of the front part of an airbag according to claim 1 wherein the electrical connections comprise mutually separable conductor portions.

15. The device for sensing movement of the front part of an airbag according to claim 13 wherein the electrical connections comprise mutually separable conductor portions.

16. The device for sensing movement of the front part of an airbag according to claim 1 wherein the separable conductor portions are arranged parallel to one another and extend transversely to the direction of movement of the sensing element.

17. The device for sensing movement of the front part of an airbag according to claim 15 wherein the separable conductor portions are arranged parallel to one another and extend transversely to the direction of movement of the sensing element.

18. The device for sensing movement of the front part of an airbag according to claim 1 wherein the separable conductor portions are equidistant from one another.

19. The device for sensing movement of the front part of an airbag according to claim 1 wherein a plurality of individual resistances are connected as electrical connections in the longitudinal direction of the strip to form a total resistance, respective individual resistances being separated during the sensing of movement.

20. The device for sensing movement of the front part of an airbag according to claim 17 wherein a plurality of individual resistances are connected as electrical connections in the longitudinal direction of the strip to form a total resistance, respective individual resistances being separated during the sensing of movement.

* * * * *